(12) United States Patent
Nezaki et al.

(10) Patent No.: US 7,924,331 B2
(45) Date of Patent: Apr. 12, 2011

(54) SOLID-STATE IMAGING DEVICE AND DRIVING METHOD THEREOF THAT PREVENTS IMAGE QUALITY DEFECT CAUSED BY COUPLING OCCURING WHEN SIGNAL CHARGE IS READ OUT FROM PHOTODIODE

(75) Inventors: Shinsuke Nezaki, Kyoto (JP); Masashi Murakami, Kyoto (JP)

(73) Assignee: PANASONIC Corporation, Osaka (JP)

( * ) Notice: Subject to any disclaimer, the term of this patent is extended or adjusted under 35 U.S.C. 154(b) by 831 days.

(21) Appl. No.: 11/610,007

(22) Filed: Dec. 13, 2006

(65) Prior Publication Data

US 2007/0146516 A1    Jun. 28, 2007

(30) Foreign Application Priority Data

Dec. 14, 2005    (JP) ................. 2005-360898

(51) Int. Cl.
H04N 3/14    (2006.01)
H04N 5/335    (2011.01)
(52) U.S. Cl. ...................... 348/308; 348/296
(58) Field of Classification Search .............. 348/302, 348/308, 294, 296
See application file for complete search history.

(56) References Cited

U.S. PATENT DOCUMENTS

| 5,814,872 | A | 9/1998 | Noda et al. |
| 6,791,613 | B2 | 9/2004 | Shinohara et al. |
| 6,933,974 | B2 * | 8/2005 | Lee ........................ 348/308 |
| 2001/0028066 | A1 | 10/2001 | Shinohara et al. |
| 2004/0183930 | A1 | 9/2004 | Masuyama et al. |
| 2005/0270392 | A1 * | 12/2005 | Kikuchi ..................... 348/308 |
| 2006/0208158 | A1 | 9/2006 | Masashi |

FOREIGN PATENT DOCUMENTS

| JP | 7-321299 A | 12/1995 |
| JP | 2001-245219 A | 9/2001 |
| JP | 2003-163843 A | 6/2003 |
| JP | 2004-080410 A | 3/2004 |
| JP | 2004-304771 | 10/2004 |
| JP | 2005-252731 A | 9/2005 |

OTHER PUBLICATIONS

English language abstract of JP 2004-304771.
English language Abstract of JP 2005-252731 A, Sep. 15, 2005.
English language Abstract of JP 2003-163843 A, Jun. 6, 2003.
English language Abstract of JP 7-321299 A, Dec. 8, 1995.
English language Abstract of JP 2001-245219 A, Sep. 7, 2001.
English language Abstract of JP 2004-080410 A, Mar. 11, 2004.

* cited by examiner

*Primary Examiner* — Timothy J Henn
(74) *Attorney, Agent, or Firm* — Greenblum & Bernstein, P.L.

(57) ABSTRACT

An object of the present invention is to provide a solid-state imaging device and driving method thereof capable of suppressing image quality defect caused by a coupling which occurs when a readout transistor that controls signal charge readout from a photodiode. The solid-state imaging device is an amplifying solid-state imaging device which includes: a unit cell having a readout transistor which reads signal charge from the photodiode, which outputs an amplifier signal corresponding to the signal charge; a first vertical signal line and a second vertical signal line connected to the unit cell; a sampling capacity which accumulates amplifier signals transmitted via the first vertical signal line and the second vertical signal line; a bias current supply, a coupling control transistor, and a coupling control circuit, which prevent transmission of the amplifier signal from the unit cell to the sampling capacity either at the start or the end of the signal charge readout by the readout transistor.

18 Claims, 14 Drawing Sheets

PRIOR ART

US 7,924,331 B2

SOLID-STATE IMAGING DEVICE AND DRIVING METHOD THEREOF THAT PREVENTS IMAGE QUALITY DEFECT CAUSED BY COUPLING OCCURING WHEN SIGNAL CHARGE IS READ OUT FROM PHOTODIODE

BACKGROUND OF THE INVENTION (1) Field of the Invention

The present invention relates to a solid-state imaging device and a driving method thereof, and particularly to an amplifying solid-state imaging device and a driving method thereof.

(2) Description of the Related Art

In recent years, amplifying solid-state imaging devices using MOS imaging element have been attracting attention as a type of solid-state imaging device. The solid-state imaging device is of high sensitivity, and has an amplifier transistor which is set for each cell representing a pixel for amplifier signals detected by a photodiode. It has been requested, for the solid-state imaging device, to improve image quality by increasing the number of pixels (to megapixel).

With respect to such a solid-state imaging device, a solid-state imaging device with pixels aligned two-dimensionally, which can switch between selection and non-selection of pixels without a transfer selection switch has been proposed in Japanese Laid-Open Patent Application No. 2004-304771 (Patent Reference 1).

The solid-state imaging device according to the Patent Reference 1 shall be described hereafter. FIG. 1 is a diagram showing a circuit configuration of a conventional solid-state imaging device according to the Patent Reference 1.

This solid-state imaging device includes: an image area 504 in which each of plural unit cells 20 are placed two-dimensionally, and which has a photodiode 21, a readout transistor 22, a reset transistor 23, an amplifier transistor 24, and a floating diffusion unit (hereinafter referred to as FD unit) 25 directly connected to a gate of the amplifier transistor 24; a row selection circuit 510 for selecting the unit cells 20 per row; a first vertical signal line 509 which transmits signal voltage of unit cells 20 per column to a signal processing unit 511; the signal processing unit 511 which holds the signal voltage transmitted via the first vertical signal line 509 and cuts noise; a column selection circuit 512 for selecting the unit cells 20 per column; a horizontal signal line 513 for transmitting the signal voltage outputted from the signal processing unit 511 to an output amplifier 514; the output amplifier 514; and a group of load transistors 515.

FIG. 2 is a diagram showing a circuit configuration of the signal processing unit 511. In FIG. 2, two vertical signal lines connected to pixels of two columns are illustrated, corresponding to the image area 504 of the solid-state imaging device shown in FIG. 1.

The signal processing unit 511 includes: a sample-hold transistor 601 connected to the first vertical signal line 509; a clamp capacitance 602 connected to the first vertical signal line 509 via the sample-hold transistor 601; a second vertical signal line 603 connected to the first vertical signal line 509 via the clamp capacitance 602; a sampling transistor 604 connected to the second vertical signal line 603; a sampling capacitance 605 connected to the second vertical signal line 603 via the sampling transistor 604; a clamp transistor 606 connected to the clamp capacitance 602 and the sampling transistor 604; a column selection transistor 607 connected to the second vertical signal line 603; and a horizontal signal line capacitance 608 connected to the horizontal signal line 513.

The sample-hold transistor 601 is switched on in response to the application of a sampling pulse for raising the electric potential of an SP line to high level, and transmits signal voltage transmitted from the first vertical signal line 509 to the clamp capacitance 602.

The second vertical signal line 603 transmits signal voltage transmitted from the first vertical signal line 509 via the clamp capacitance 602.

The sampling transistor 604 is switched on in response to the application of a capacitance selection pulse for raising the electric potential of an SW line to high level, and transfers the signal voltage transmitted by the second vertical signal line 603, to the sampling capacitance 605.

The clamp transistor 606 is switched on in response to the application of clamp pulse for raising the electric potential of the CP line to high level, and reset the second vertical signal line 603, the clamp capacitance 602, and the sampling capacitance 605 to the electric potential of the CLDCNC line. The clamp capacitance 602 removes fixed pattern noise which varies from each unit cell 20 by holding the electric voltage between terminals A and B when the electric potential is reset.

The column selection transistor 607 is sequentially switched on in response to the application of a column selection pulse for raising the electric potential of a CSEL line to high level, and transfers the signal voltage accumulated in the sampling capacitance 605 to the horizontal signal line 513.

The sampling capacitance 605 holds the signal voltage which is read per row.

The operations of the abovementioned conventional solid-state imaging device are described hereafter with reference to a driving timing chart shown in (a) in FIG. 3.

When the unit cell 20 in mth row is selected, a row selection pulse for raising the electric potential of an LSET (m) line to high level is applied to the vertical selection transistor 26 in the unit cell 20 of mth row. The vertical selection transistor 26 is switched on. A source follower circuit is formed by the amplifier transistor 24 and a group of load transistors 515, and the voltage following the pixel power supply of the unit cell 20 is outputted from the source follower circuit to the first vertical signal line 509.

Next, a sampling pulse for raising the electric potential of the SP line to high level is applied to the sample-hold transistor 601. The sample-hold transistor 601 is switched on and the voltage outputted from the source follower circuit to the first vertical signal line 509 is held in the clamp capacitance 602. Here, a clamp pulse for raising the electric potential of the CP line to high level is applied to the clamp transistor 606. The clamp transistor 606 is switched on and the second vertical signal line 603 side of the clamp capacitance 602 is reset to the electric potential of the CLDCNC line. In addition, since a capacitance selection pulse for raising the electric potential of the SW line to high level is applied at the same time, the sampling transistor 604 is switched on, and the sampling capacitance 605 is reset to the electric potential of the CLDCNC line.

Next, a reset pulse (m) for raising the electric potential of the RESET (m) line to high level is applied to the reset transistor 23. The reset transistor 23 is switched on, and the electric potential of the FD unit 25 is reset. A gate voltage of the amplifier transistor 24 connected to the FD unit 25 is the voltage of the FD unit 25, and a voltage in accordance with this voltage, more specifically, an voltage given by (electric potential of the FD unit−Vt)×α is outputted to the first vertical signal line 509. Here, Vt is a threshold voltage of the amplifier transistor 24, and α is an voltage amplification rate.

Next, a clamp pulse for lowering the electric potential of the CP line to low level is applied to the clamp transistor 606.

The clamp transistor 606 is switched off, and the electric potential of the second vertical signal line 603 falls in a floating state.

Next, a readout pulse (m) for raising the electric potential of READ (m) line to high level is applied to the readout transistor 22. The readout transistor 22 is switched on, and the signal charge which is accumulated in the photodiode 21 is transferred to the FD unit 25. The gate voltage of the amplifier transistor 24 connected to the FD unit 25 becomes the electric potential of the FD unit 25, and a voltage corresponding to this voltage, more specifically, a voltage calculated by (electric potential of the FD unit−Vt)×α is outputted to the first vertical signal line 509. Here, the clamp transistor 606 is switched off, since a clamp pulse for lowering the electric potential of the CP line to low high level is applied to the clamp transistor 606. In the sampling capacity 605, voltage change corresponding to a difference between the outputted voltage which is outputted to the first vertical signal line 509 when the electric potential of the FD unit 25 is reset and the voltage outputted to the first vertical signal line 509 when a signal charge accumulated in the photodiode 21 is transferred to the FD unit 25, is accumulated as a signal voltage of the unit cell 20 in mth row.

Next, a column selection pulse (m) for raising the electric potential of the CSEL (m) line to high level, a column selection pulse (m+1) for raising the electric potential of the CSEL (m+1) line to high level . . . is sequentially applied to the column selection transistor 607. Each of the column selection transistors 607 is sequentially switched on, and the signal voltage accumulated in the sampling capacitance 605 is sequentially outputted to the horizontal signal line 513.

SUMMARY OF THE INVENTION

In the driving timing of the conventional amplifying solid-state imaging device, coupling of the readout transistor to the FD unit occurs on the operations when the readout transistor is switched on or switched off. In other words, image quality defect is caused by the influence of coupling of the readout transistor on the vertical signal line.

The image quality defect is described hereafter in detail. (b) in FIG. 3 is a diagram showing electric potential changes in the FD unit 25 and the first vertical signal line 509 in the case where the readout pulse added to the readout transistor 22 of the solid-state imaging device shown in FIG. 1 changes either from low-level to high-level or from high-level to low-level when the photodiode 21 is in the dark, that is, when no signal charge is accumulated in the photodiode 21.

As shown in (b) in FIG. 3, in the case where the readout pulse changes from low-level to high-level, and the readout transistor 22 is switched on ($t_1$ in FIG. 3), the electric potential of the FD unit 25 rises by the coupling of the readout transistor 22 to the FD unit 25 through capacitance between the gate and the source of the readout transistor 22. As a result, the electric potential of the first vertical signal line 509 rises through the source follower. Since the level of sampling pulse is high in this state, the electric potential of the second vertical signal line 603 changes as well.

In addition, as shown in (b) in FIG. 3, in the case where the readout pulse changes from high-level to low-level, and the readout transistor 22 is switched off ($t_2$ in FIG. 3), the electric potential of the FD unit 25 falls by the coupling of the readout transistor 22 to the FD unit 25 through capacitance between the gate and the source of the transistor 22. As a result, the electric potential of the first vertical signal line 509 rises through the source follower Since the level of sampling pulse is high in this state, the electric potential of the second vertical signal line 603 changes as well.

Thus, in the conventional amplifying solid-state imaging device, the electric potential of the second vertical signal line 603 changes by the coupling of electric potential change for operating the readout transistor 22. The amount of coupling of the readout transistor 22 varies from column to column, and thus the electric potential change of the vertical signal line 603 of each column varies as well. Therefore, when a signal component of each column is extracted by the column selection circuit 512 and outputted from the column selection circuit 512, an output of each column varies. As a result, the conventional solid-state imaging device has a problem of image quality defect.

In view of the abovementioned problem, an object of the present invention is to provide a solid-state imaging device and its driving method for preventing the image quality defect caused by coupling which occurs when the readout transistor which controls the signal charge readout is operated.

To achieve the abovementioned object, the solid-state imaging device according to the present invention includes: a unit cell which (i) includes a photodiode which converts light to signal charge and accumulates the converted signal charge, and a readout transistor which reads the signal charge from the photodiode, and (ii) outputs an amplifier signal corresponding to the signal charge; a signal line connected to the unit cell; an accumulation element which accumulates the amplifier signal transmitted via the signal line; and a transmission prevention unit operable to prevent transmission of the amplifier signals from the unit cell to the accumulation element either at the start or at the end of the signal charge readout performed by the readout transistor. Here, the transmission prevention unit may be made up of a constant-voltage source connected to the signal line between the unit cell and the accumulation element, a first transmission prevention transistor inserted between the constant-voltage source and the signal line, and a first control unit operable to control the first transmission prevention transistor.

In addition, the present invention may also be a driving method of an amplifying solid-state imaging device which includes: a unit cell which (i) includes a photodiode which converts light to signal charge and accumulates the converted signal charge and a readout transistor which read the signal charge from the photodiode, and (ii) outputs an amplifier signal corresponding to the signal charge; a signal line connected to the unit cell; an accumulation element which accumulates the amplifier signals transmitted via the signal line; a first transmission prevention transistor; and a first control unit operable to control the first transmission prevention transistor, the method includes controlling the first transmission prevention transistor to be switched off by the first control unit either at the start or at the end of the signal charge readout.

Thus, the transmission of the voltage change in the gate of readout transistor to the signal line can be suppressed, and the influence of coupling occurs when the readout transistor is operated is also suppressed. Therefore, it is possible to prevent image defect caused by coupling which occurs when the readout transistor is operated.

According to the present invention, it is possible to prevent image quality defect caused by a coupling which occurs when the readout transistor is in operation. Therefore, a high-performance solid-state imaging device with low-cost can be realized, and the present invention is particularly useful for a solid-state imaging device with miniaturized wiring, which amplifies signals from photodiode in a circuit.

FURTHER INFORMATION ABOUT TECHNICAL BACKGROUND TO THIS APPLICATION

The disclosure of Japanese Patent Application No. 2005-360898 filed on Dec. 14, 2005 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

Figure 1:
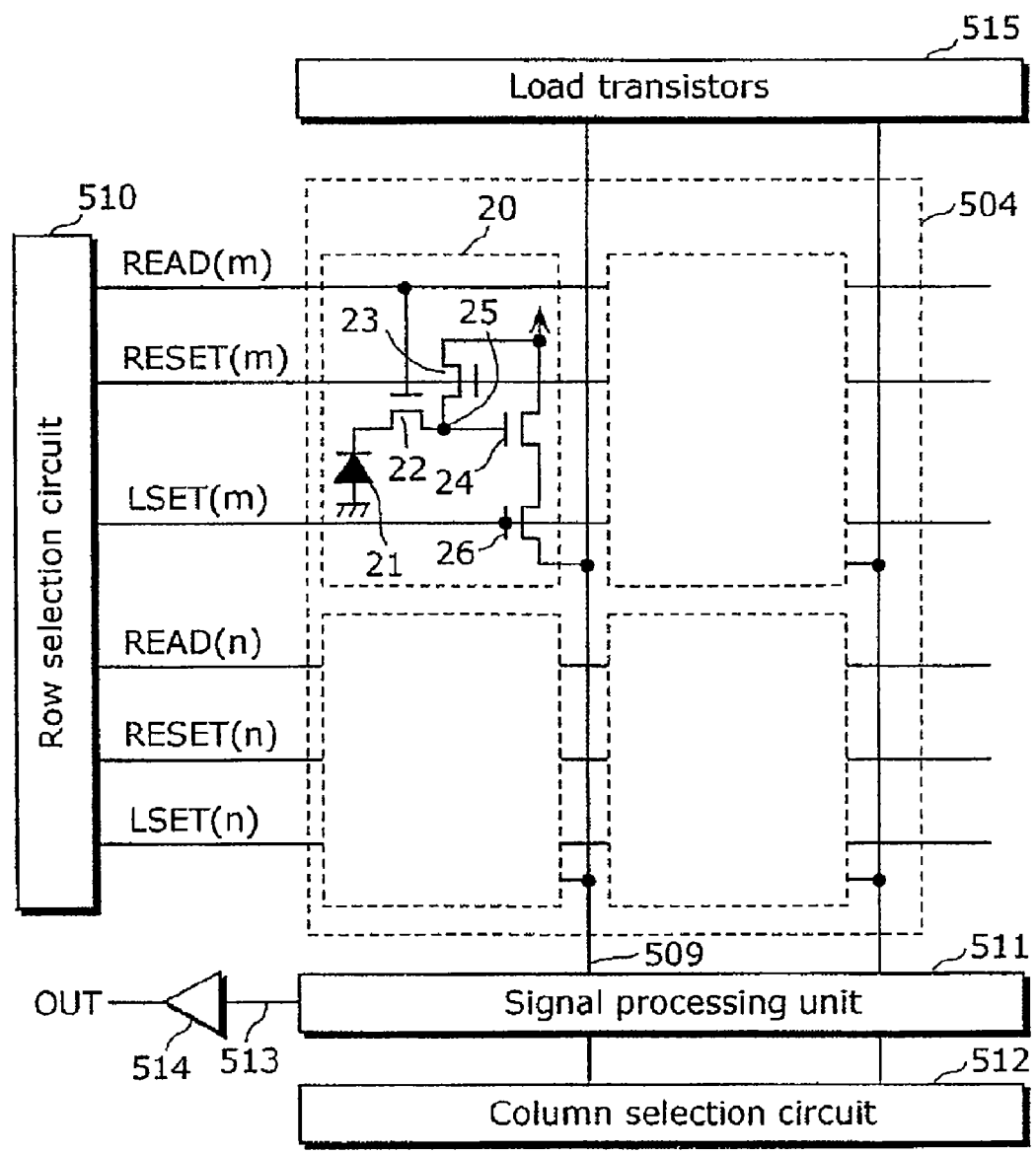
FIG. 1 shows a circuit configuration of a conventional solid-state imaging device.
Figure 2:
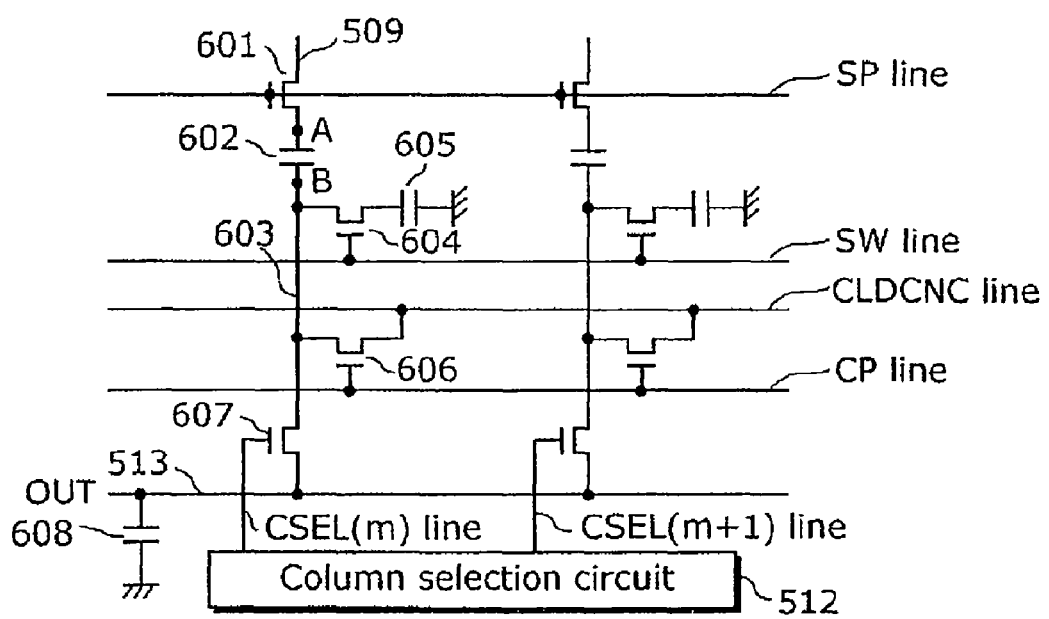
FIG. 2 shows a circuit configuration of a signal processing unit.
Figure 3:
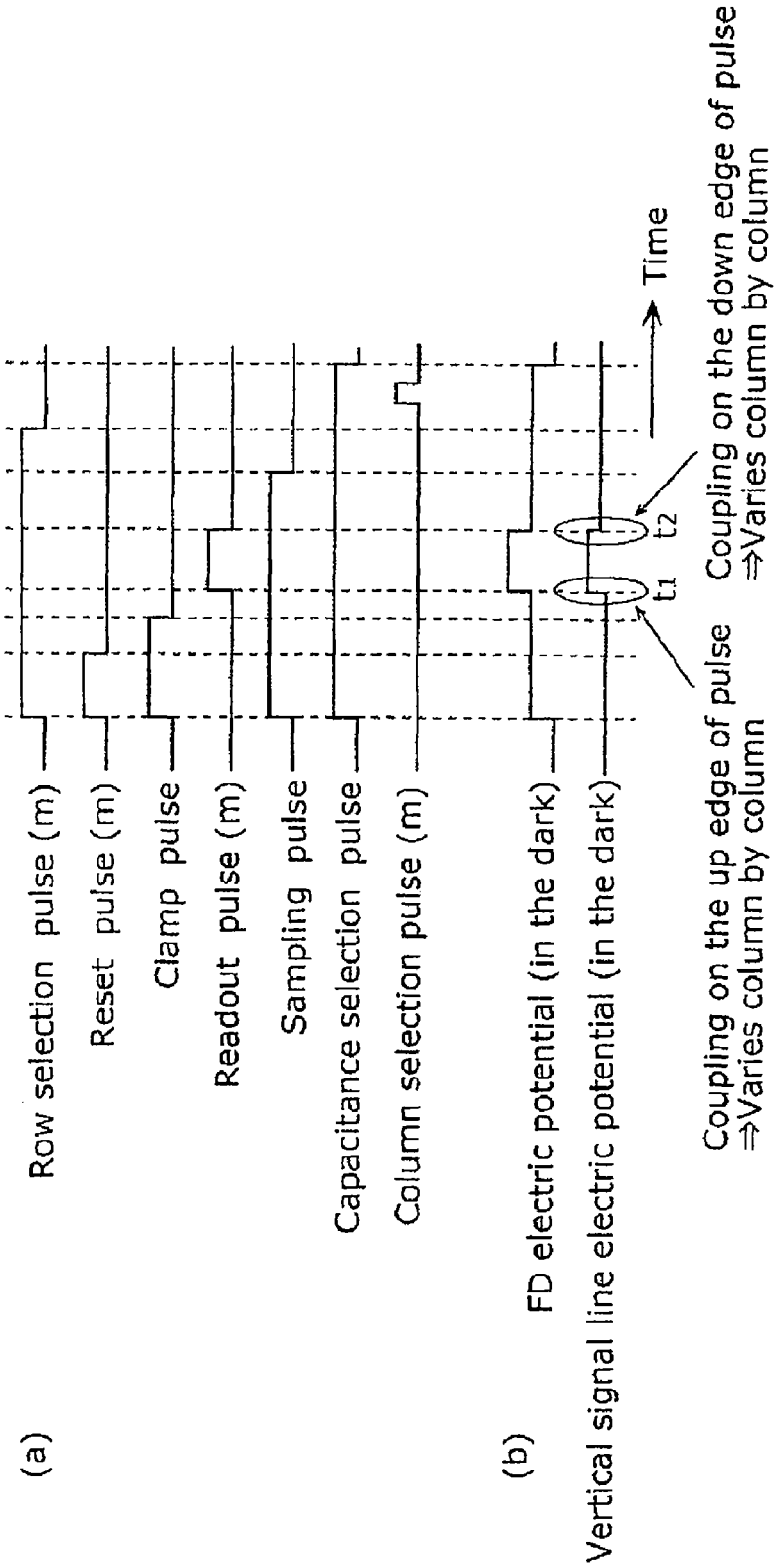
Figure 4:
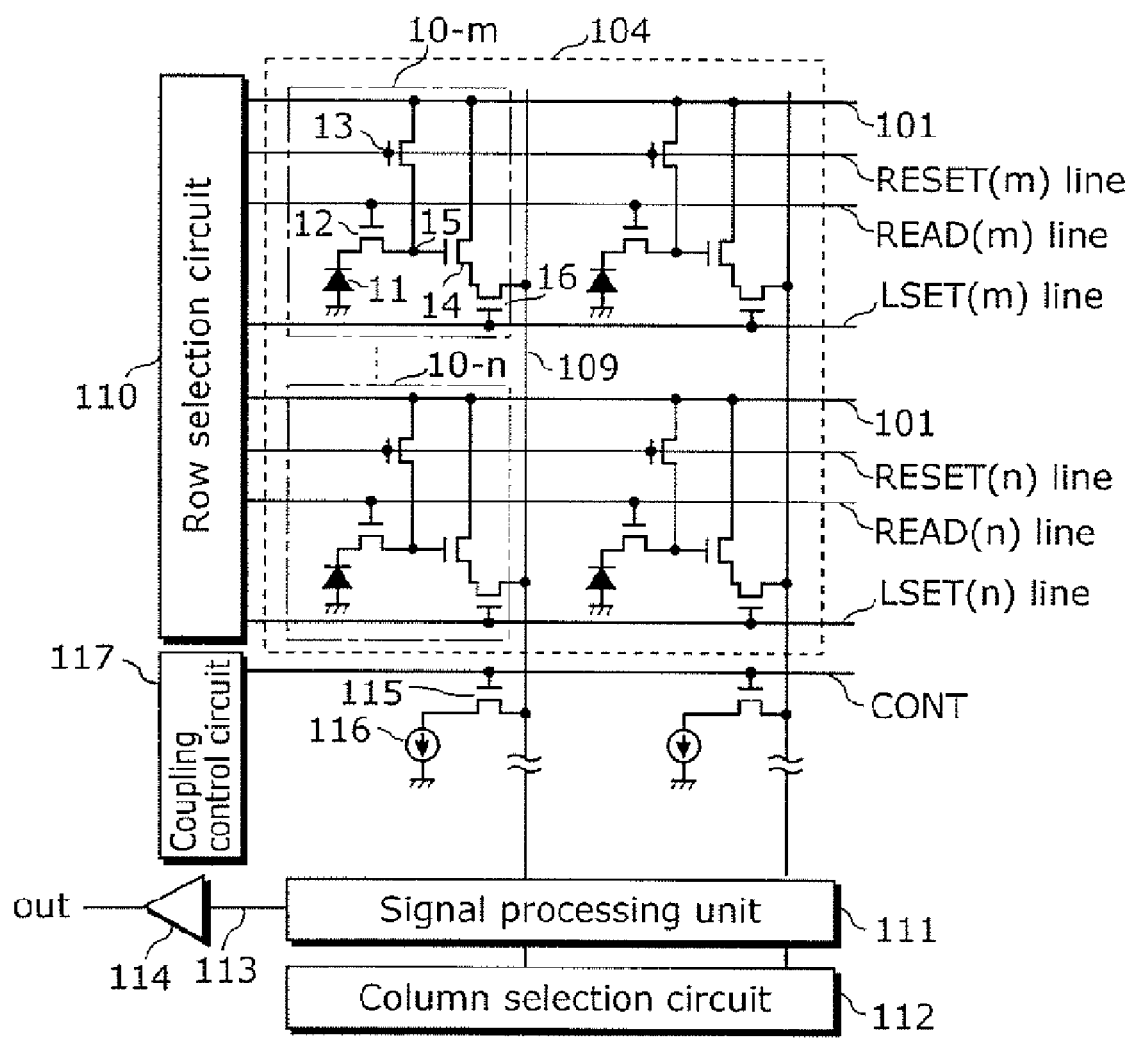
Figure 5:
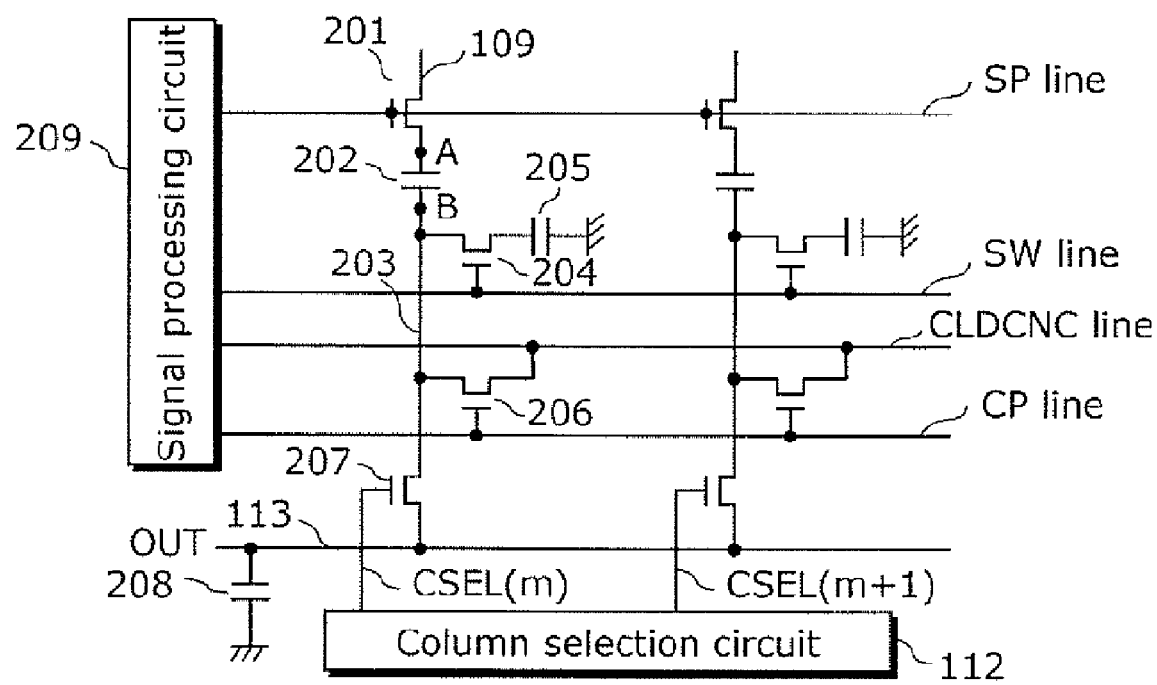
Figure 6:
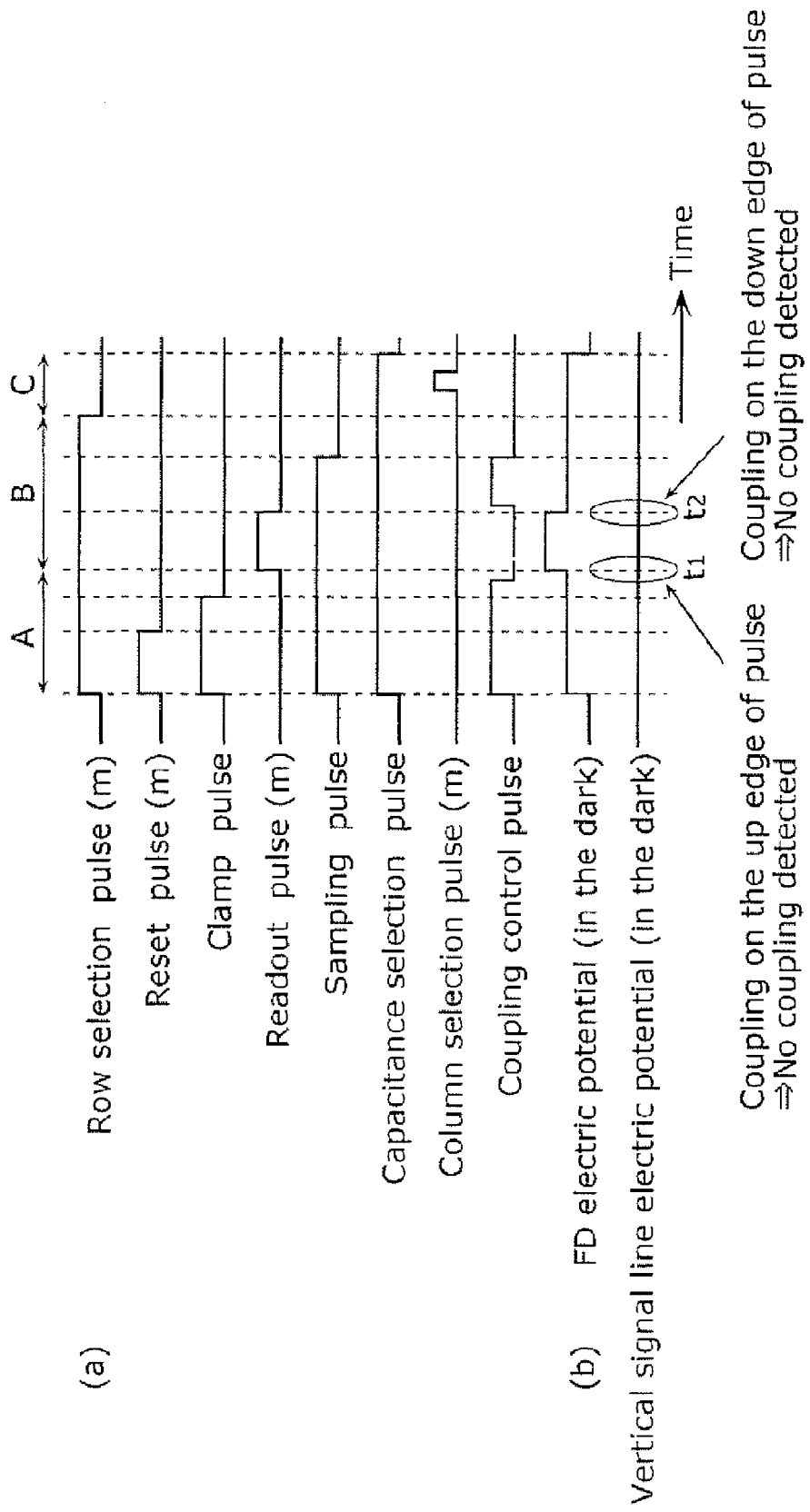
Figure 7:
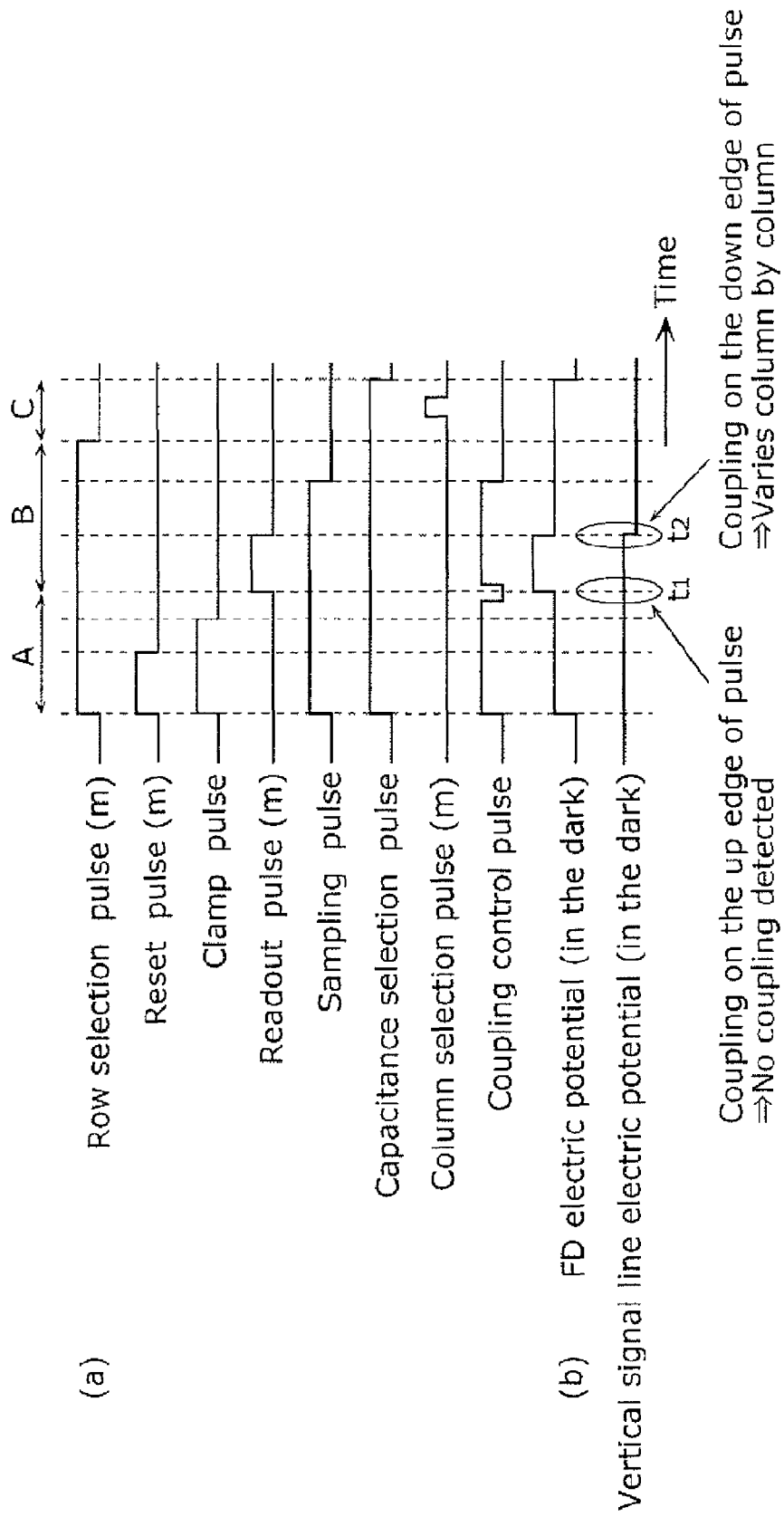
Figure 8:
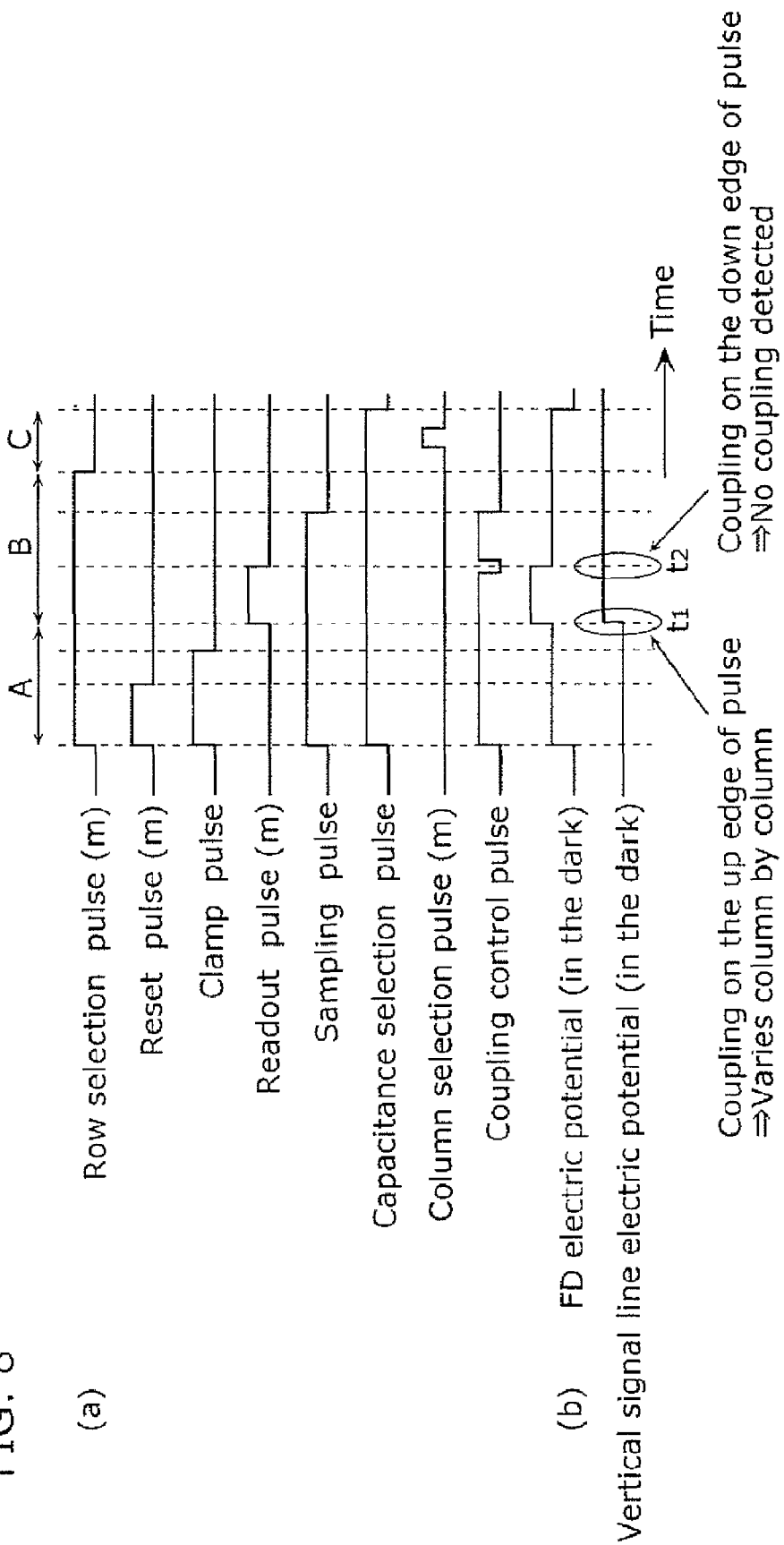
Figure 9:
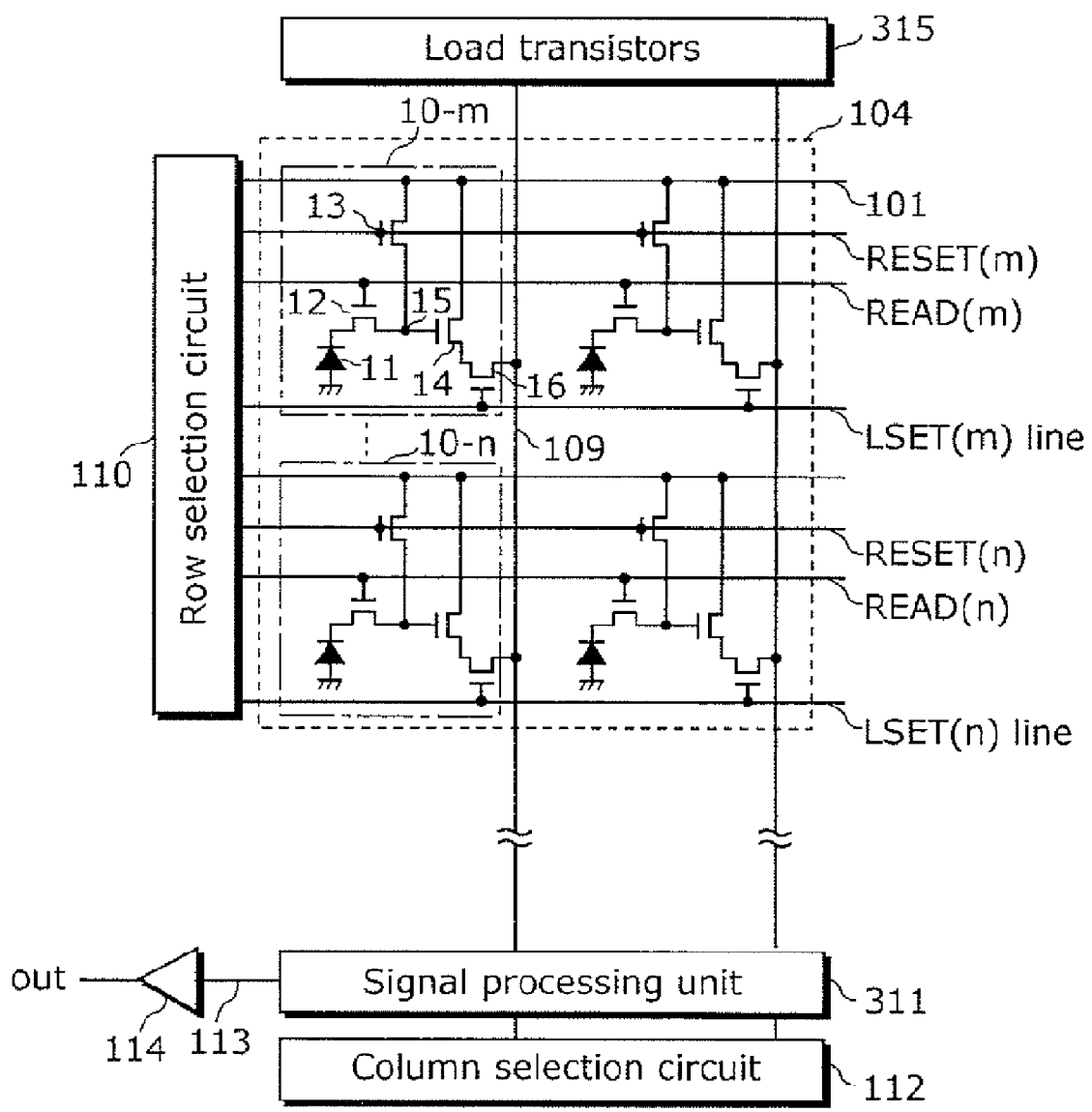
Figure 10:
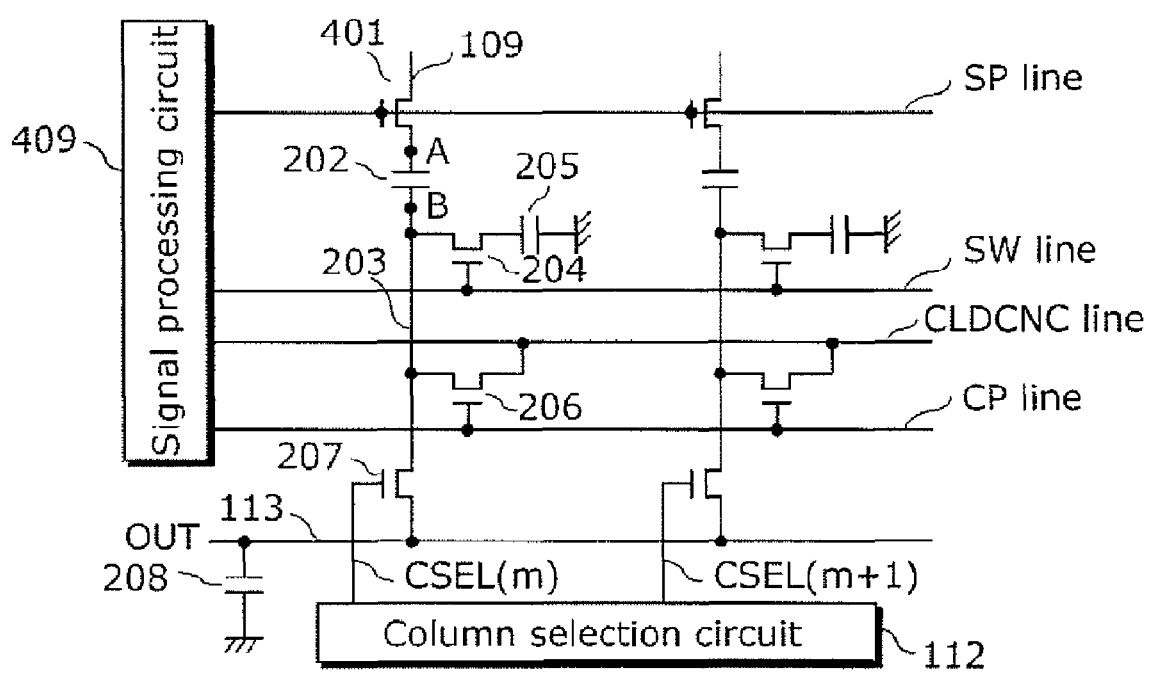
Figure 11:
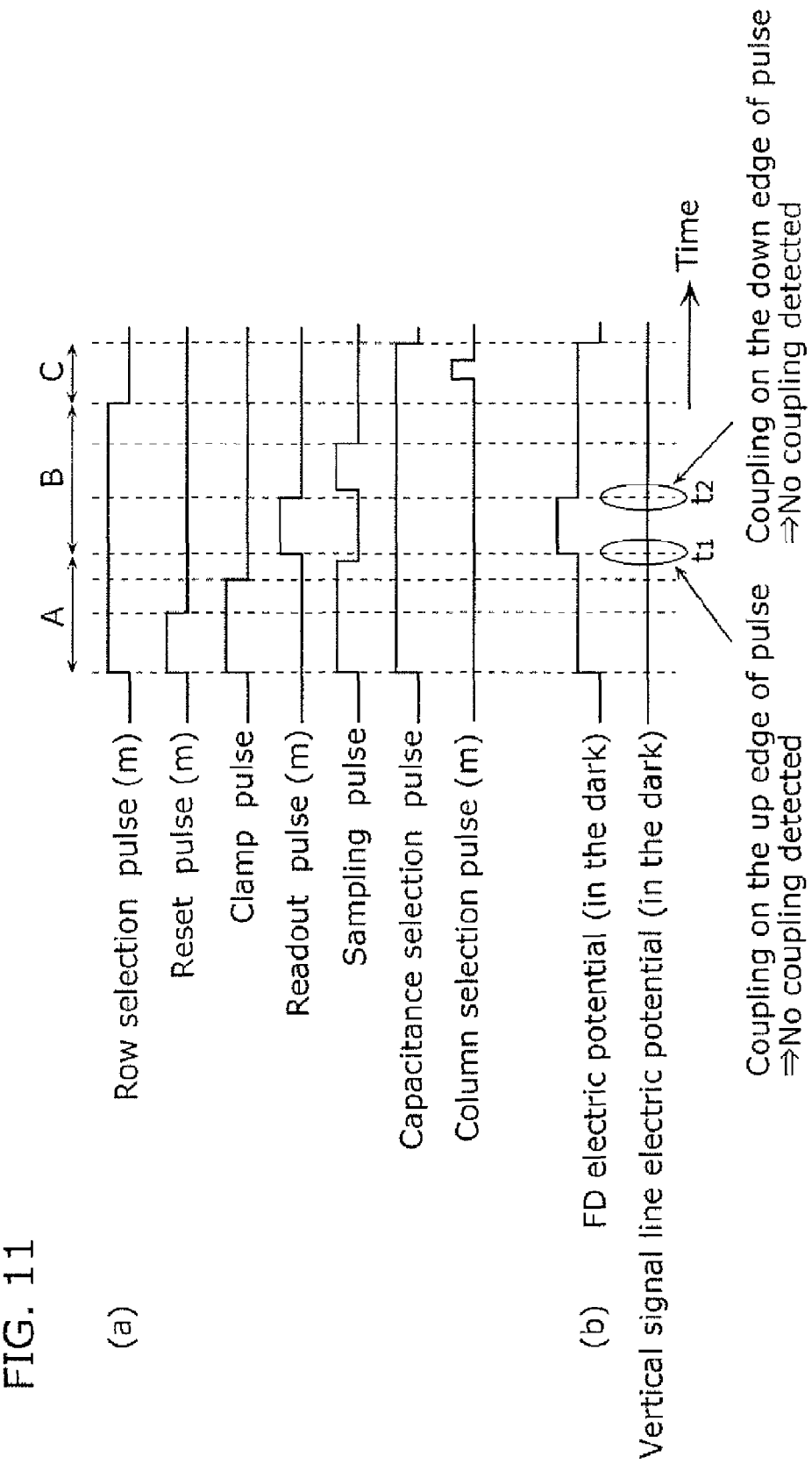
Figure 12:
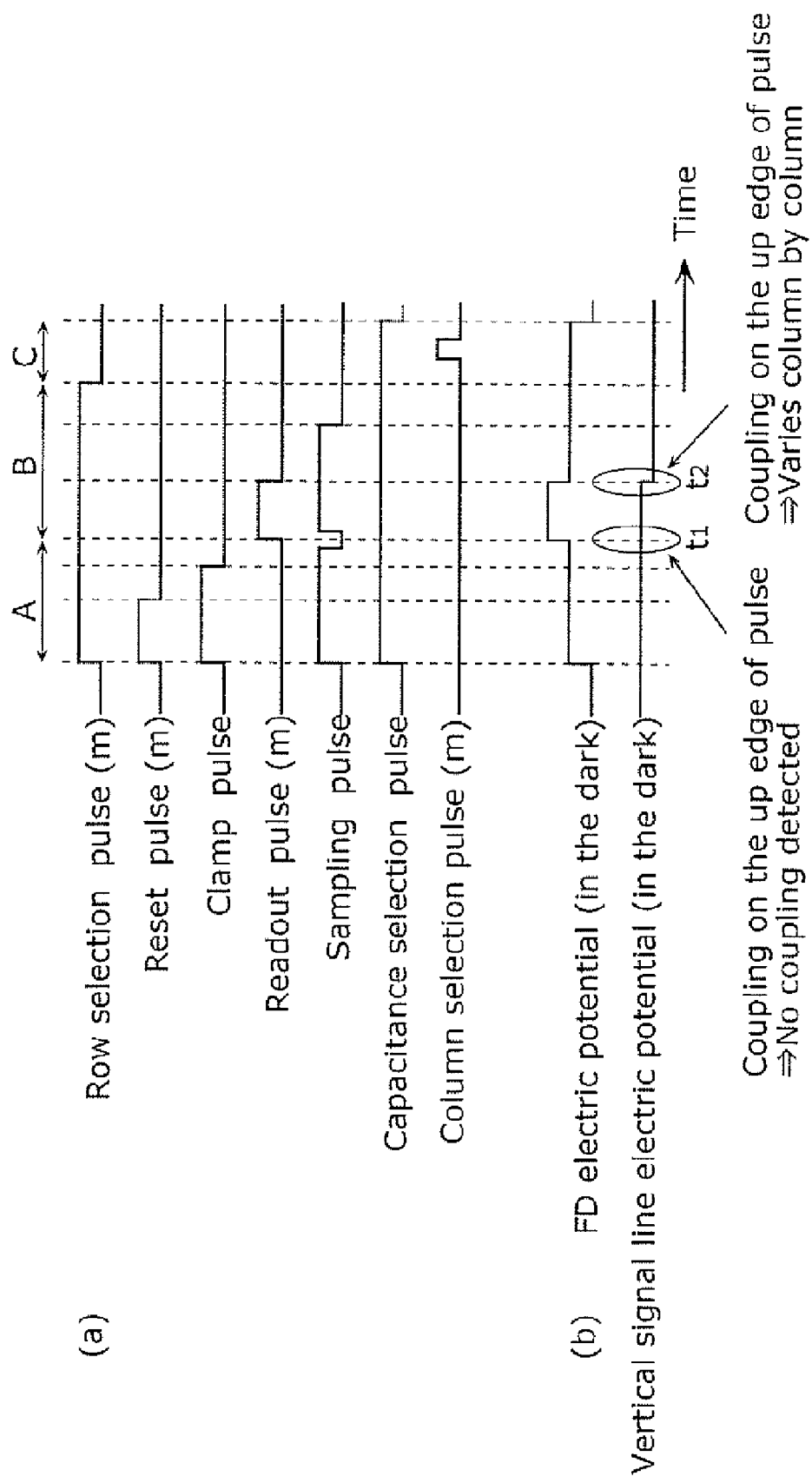
Figure 13:
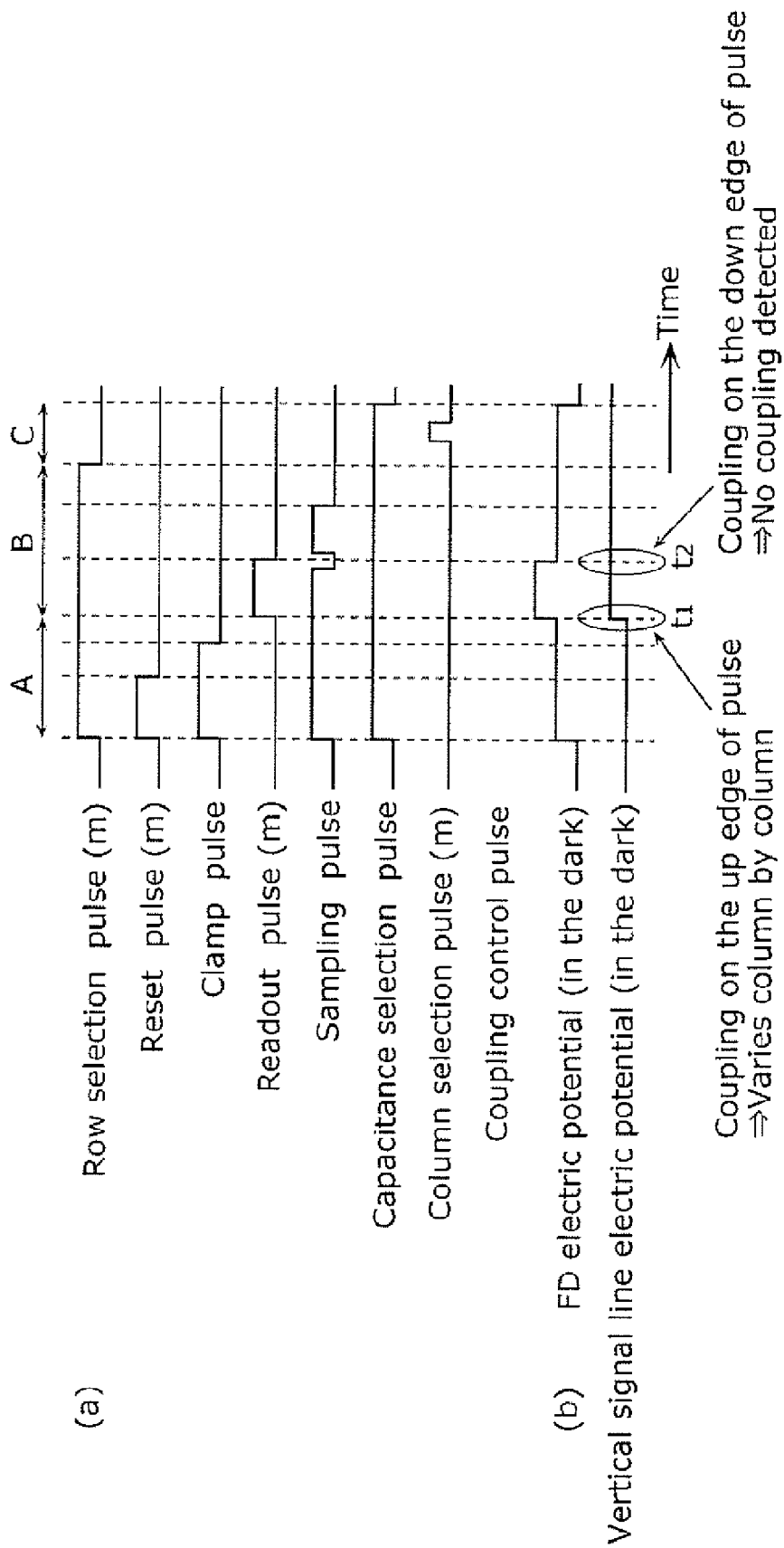
Figure 14:
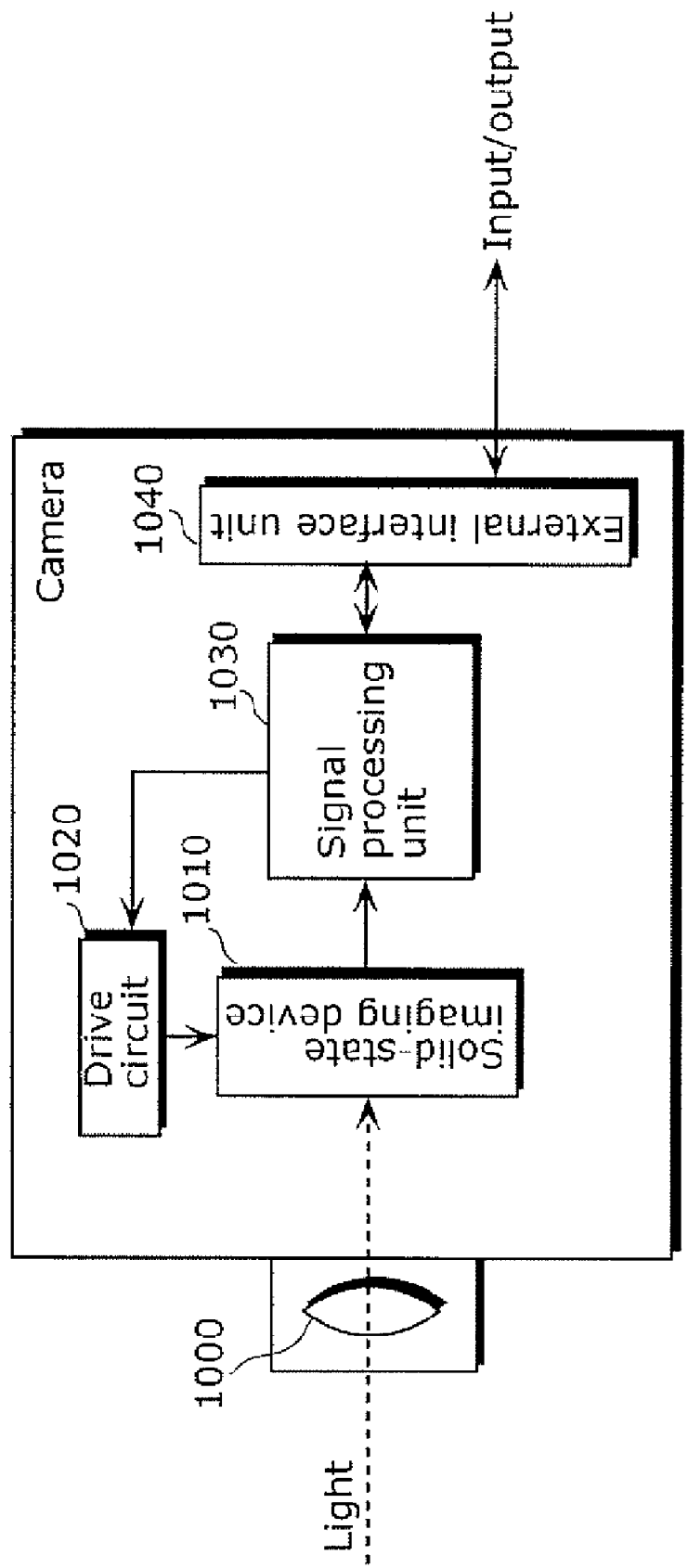

(a) in FIG. 3 is a timing chart showing operations of the conventional solid-state imaging device, and (b) in FIG. 3 is a diagram illustrating electric potential changes in the FD unit and the vertical signal line;

FIG. 4 is a diagram showing a circuit configuration of an amplifying solid-state imaging device according to the first embodiment of the present invention;

FIG. 5 is a diagram showing a circuit configuration of the signal processing unit;

(a) in FIG. 6 is a timing chart showing operations of the solid-state imaging device according to the first embodiment, (b) in FIG. 6 is a diagram showing the electric potential changes in the FD unit and the vertical signal line;

(a) in FIG. 7, is a timing chart showing variation of the operations of the solid-state imaging device according to the first embodiment, (b) in FIG. 7 is a diagram showing voltage changes in the FD unit and in the vertical signal line;

(a) in FIG. 8, is a timing chart showing variation of the operations of the solid-state imaging device according to the first embodiment, (b) in FIG. 8 is a diagram showing voltage changes in the FD unit and in the vertical signal line;

FIG. 9 is a diagram showing a circuit configuration of an amplifying solid-state imaging device according to the second embodiment of the present invention;

FIG. 10 shows a circuit configuration of a signal processing unit;

(a) in FIG. 11 is a timing chart showing operations of the solid-state imaging device according to the second embodiment, (b) in FIG. 11 is a diagram showing the electric potential changes in the FD unit and the vertical signal line;

(a) in FIG. 12, is a timing chart showing variation of the operations of the solid-state imaging device according to the second embodiment, (b) in FIG. 12 is a diagram showing voltage changes in the FD unit and in the vertical signal line;

(a) in FIG. 13, is a timing chart showing variation of the operations of the solid-state imaging device according to the second embodiment, (b) in FIG. 13 is a diagram showing voltage changes in the FD unit and in the vertical signal line; and FIG. 14 is a block diagram showing a camera according to the third embodiment of the present invention.

DESCRIPTION OF THE PREFERRED EMBODIMENT(S)

First Embodiment

A solid-state imaging device and driving method thereof according to the first embodiment of the present invention shall be described hereafter with reference to the diagrams.

FIG. 4 is a diagram showing a circuit configuration of an amplifying solid-state imaging device according to the first embodiment. The solid-state imaging device includes: an image area 104 in which each of plural unit cells 10 are placed in matrix form, each of the unit cells include a photodiode 11 which converts light into signal charge and accumulates the converted signal charge, a readout transistor 12 which reads signal charge from the photodiode 11, a reset transistor 13, an amplifier transistor 14, a floating diffusion unit (hereinafter referred to as FD unit) 15 directly connected to a gate of the amplifier transistor 14, and a vertical selection transistor 16; a row selection circuit 110 which are connected to the unit cells 10 and is for selecting the unit cells 10 per row; a first vertical signal line 109 which transmits signal voltage of unit cells 10 per column to a signal processing unit 111; a bias current supply 116 which is set for each row of the unit cells 10 and is connected to the first vertical signal line 109 between the unit cells 10 and the signal processing unit 111; a coupling control transistor 115 set for each row of the unit cells 10, and inserted between the bias current supply 116 and the first vertical signal line 109; a coupling control circuit 117 which controls the coupling control transistor 115, the signal processing unit 111 which holds the signal voltage transmitted via the first vertical signal line 109 and cuts noise; a column selection circuit 112 for selecting the unit sells 10 per column; a horizontal signal line 113 for transmitting the signal voltage outputted from the signal processing unit 111 to an output amplifier 114; the output amplifier 114; and a group of load transistors 115.

Note that only two columns of the first pixel columns and the second pixel columns are shown in the image area 104 for convenience. It is also noted that each unit cell 10 is connected to the pixel power source via a signal line 101.

The coupling control transistor 115 is switched off in response to an application of a coupling control pulse for lowering the electric potential of the CONT line to low level, and prevents the transmission of amplifier signal from the corresponding column of unit cell 10 to the signal processing unit 111.

The coupling control circuit 117 controls on and off of the coupling control transistor 115 so that the transmission of an amplifier signal of the unit cell 10 to the signal processing unit 111 is prevented both at the start and the end of the signal charge readout carried out by the readout transistor 12. In other words, the coupling control circuit 117 switches off the coupling control transistor 115 at the start and the end of the signal charge readout performed by the readout transistor 12.

Note that a bias current supply 116, the coupling control transistor 115 and the coupling control circuit 117 are respectively examples of a constant voltage source, the first transmission prevention transistor, and the first control unit configuring a transmission prevention unit.

As described above, the solid-state imaging device according to the first embodiment of the present invention is characterized in configuration that the coupling control circuit 117 is included as the transmission prevention unit.

FIG. 5 is a diagram showing a circuit configuration of the signal processing unit 111. In FIG. 5, corresponding to the image area 104 of the solid-state imaging device shown in FIG. 4, and the vertical signal lines connected to pixels of 2 columns are shown.

The signal processing unit 111 includes: a sample-hold transistor 201 connected to a signal line between the unit cell 10 and a sampling capacity 205, specifically, between the first vertical signal line 109 and the second vertical signal line 203; a clamp capacitance 202 connected to the first vertical signal line 109 via the sample-hold transistor 201; a second vertical signal line 203 connected to the first vertical signal line 109 via the clamp capacitance 202; a sampling transistor 204 connected to the second vertical signal line 203; a sampling capacitance 205 connected to the second vertical signal line 203 via the sampling transistor 204, and is an accumulation element which accumulates amplifier signals transmitted via the first vertical signal line 109 and the second vertical signal line 203; a clamp transistor 206 connected to the clamp capacitance 202 and the sampling transistor 204; a column selection transistor 207 connected to the second vertical signal line 203; a horizontal signal line capacitance 208 connected to the horizontal signal line 113; and a signal processing circuit 209.

The sample-hold transistor 201 is switched on in response to the application of a sampling pulse for raising the electric potential of an SP line to high level, and transmits signal voltage transmitted from the first vertical signal line 109 to the clamp capacitance 202.

The second vertical signal line 203 transmits signal voltage transmitted from the first vertical signal line 109 via the clamp capacitance 202.

The sampling transistor 204 is switched on in response to the application of a capacitance selection pulse for raising the electric potential of an SW line to high level, and transfers the signal voltage transmitted by the second vertical signal line 203 to the sampling capacitance 205.

The clamp transistor 206 is switched on in response to the application of clamp pulse for raising the electric potential of the CP line to high level, and reset the second vertical signal line 203, the clamp capacitance 202, and the sampling capacitance 205 to the electric potential of the CLDCNC line. The clamp capacitance 202 removes fixed pattern noise which varies from each unit cell 20 by holding the electric voltage between terminals A and B when the electric potential is reset.

The column selection transistor 207 is sequentially switched on in response to the application of a column selection pulse for raising the electric potential of a CSEL line to high level, and transfers the signal voltage accumulated in the sampling capacitance 205 to the horizontal signal line 113.

The sampling capacitance 205 are placed for each column of the unit cells 10, and accumulates the signal voltage of each column of the unit cells 10.

The signal processing circuit 209 applies pulse to the SP line, the SW line, and the CP line. The operations of the abovementioned conventional solid-state imaging device according to the first embodiment are described hereafter with reference to a driving timing chart shown (a) in FIG. 6.

When the unit cell 10-*m* in mth row is selected, in a time domain shown as A in (a) in FIG. 6, a row selection pulse for raising the electric potential of an LSET (m) line to high level is applied to the vertical selection transistor 16, and the vertical selection transistor 16 is switched on. Here, since a coupling control pulse for raising the electric potential of the CONT line to high level is applied to the coupling control transistor 115, a source follower circuit is formed by an amplifier transistor 14 and a bias current supply 116, and the voltage following the pixel power supply of the unit cell 20 is outputted from the source follower circuit to the first vertical signal line 109.

In addition, a sampling pulse for raising the electric potential of the SP line to high level is applied to the sample-hold transistor 201. The sample-hold transistor 201 is switched on and the voltage outputted from the source follower circuit to the first vertical signal line 109 is held in the clamp capacitance 202. Here, a clamp pulse for raising the electric potential of the CP line to high level is applied to the clamp transistor 206. The clamp transistor 206 is switched on and the second vertical signal line 203 side of the clamp capacitance 202 is reset to the electric potential of the CLDCNC line. In addition, since a capacitance selection pulse for raising the electric potential of the SW line to high level is applied at the same time, the sampling transistor 604 is switched on, and the sampling capacitance 205 is reset to the electric potential of the CLDCNC line.

In addition, a reset pulse (m) for raising the electric potential of the RESET (m) line to high level is applied to the reset transistor 13. The reset transistor 13 is switched on, and the electric potential of the FD unit 15 is reset. A gate voltage of the amplifier transistor 14 connected to the FD unit 15 is the voltage of the FD unit 15, and a voltage in accordance with this voltage, more specifically, an voltage given by (electric potential of the FD unit−Vt)×α is outputted to the first vertical signal line 109. Here, Vt is a threshold voltage of the amplifier transistor 14, and α is an voltage amplification rate.

Next, a clamp pulse for lowering the electric potential of the CP line to low level is applied to the clamp transistor 206. The clamp transistor 206 is switched off, and the electric potential of the second vertical signal line 203 falls in a floating state.

Next, in a time domain shown as B in (a) in FIG. 6, a readout pulse (m) for raising the electric potential of READ (m) line to high level is applied to the readout transistor 12. The readout transistor 12 is switched on, and the signal charge accumulated in the photodiode 11 is transferred to the FD unit 15. The gate voltage of the amplifier transistor 14 connected to the FD unit 15 becomes the electric potential of the FD unit 15, and a voltage corresponding to this voltage, more specifically, a voltage given by (electric potential of the FD unit−Vt)×α is outputted to the first vertical signal line 109. Here, the clamp transistor 206 is switched off, since a clamp pulse for lowering the CP line is applied to the clamp transistor 206. In the sampling capacity 205, voltage change corresponding to a difference between the outputted voltage which is outputted to the first vertical signal line 109 when the electric potential of the FD unit 15 is reset and the voltage outputted to the first vertical signal line 109 and when a signal charge accumulated in the photodiode 11 is transferred to the FD unit 15, is accumulated as a signal voltage of the unit cell 10-*m* in mth row.

Here, when the readout transistor 12 is switched on from off-state ($t_1$ in FIG. 6) and when switched off from on-state ($t_2$ in FIG. 6), the coupling control pulse is temporarily lowered to low level and the coupling control transistor 115 is switched off. Thus, as shown in (b) in FIG. 6, when the readout transistor 12 is switched on from off-state, the influence of a voltage coupling to the FD unit 15 caused by a parasitic capacitance between the gate and the source of the readout transistor 12 is transmitted to the first vertical signal line 109, but not to the second signal line 203. In addition, when the readout transistor 12 switched off from on state, the influence of a voltage coupling to the FD unit 15 caused by the parasitic capacitance between the gate and the source of the readout transistor 12 is also transmitted to the first vertical signal line 109, but not to the second vertical signal line 203.

Next, in a time region shown as C in (a) in FIG. 6, a column selection pulse (m) for raising the electric potential of the CSEL (m) line to high level, a column selection pulse (m+1) for raising the electric potential of the CSEL (m+1) line to high level... are sequentially applied to the column selection transistor 207. Each of the column selection transistors 207 is sequentially switched on, and the signal voltage accumulated in the sampling capacitance 205 is sequentially outputted to the horizontal signal line 113.

As described above, according to the solid-state imaging device according to the first embodiment, in the case where the readout transistor 12 is switched off from on-state, the coupling control transistor 108 is temporarily switched off by lowering the coupling control pulse to low level. Although a voltage change in the gate of the readout transistor 12 causes coupling to the FD unit 15 via the capacitance between the source and the gate and the electric potential of the FD unit 15 changes, the transmission of the electric potential change to the second vertical signal line 203 via a source follower of the FD unit 15 can be suppressed. In other words, image quality defect caused by coupling influence can be suppressed since it is possible to suppress the transmission of the coupling in the FD unit 15 to the second vertical signal line 203 and the influence caused by the coupling variation occurs in each row to the second vertical signal line 203. In addition, in an attempt to lower the noises by amplifying a signal component to be achieved by an amplification function such as amplifiers on a vertical signal line, the influence of coupling is not transmitted, and thus an amplification rate of the signals from a photodiode can be increased than the conventional cases. Therefore, the solid-state imaging device can make a significant contribution for lowering noises.

It is noted that, in the solid-state imaging device of the first embodiment, on and off of the coupling control transistor 115 is controlled so that the transmission of the amplifier signals from the unit cell 10 to the signal processing unit 111 is prevented both at the start and the end of the signal charge readout by the readout transistor 12. However, either at the start or the end of the signal charge readout by the readout transistor 12, the on and off of the coupling control transistor 115 may be controlled so that the transmission of the amplifier signal from the unit cell 10 to the signal processing unit 111 can be prevented.

In other words, as shown in (a) in FIG. 7, only when the state of the readout transistor 12 is switched on from off state, the coupling control transistor 115 may temporarily be switched off by lowering the level of the coupling control pulse to low level. Thus, as shown in (b) in FIG. 7, when the readout transistor 12 is switched on from off state, transmission of the influence of coupling in the FD unit 15 to the second vertical signal line 203 can be suppressed, and thus transmission of the coupling variation in the FD unit 15 to the second vertical signal line 203 can be suppressed. Therefore, image quality defect caused by coupling can be suppressed.

In addition, as shown in (a) in FIG. 8, only when the readout transistor 12 is switched off from on-state, the coupling control transistor 115 may be temporarily switched off by lowering the level of the coupling control pulse to low level. Thus, as shown in (b) in FIG. 8, when the readout transistor 12 is switched off from on state, the transmission of the coupling influence in the FD unit 15 to the second vertical signal line 203 can be suppressed, and thus the influence of the coupling variation in the FD unit 15 can be suppressed. Therefore, image quality defect caused by coupling can be suppressed.

In addition, in the solid-state imaging device of the first embodiment, although it is described that the coupling control transistor 115 is placed on the first vertical signal line 109 between the image area 104 and the signal processing unit 111, the coupling control transistor 115 may be placed anywhere on the vertical signal line 109.

Second Embodiment

A solid-state imaging device and driving method thereof according to the second embodiment of the present invention shall be described hereafter with reference to the drawings, focusing on the difference from the solid-state imaging device according to the first embodiment.

FIG. 9 is a diagram showing a circuit configuration of an amplifying solid-state imaging device according to the second embodiment.

The solid-state imaging device differs from the solid-state imaging device of the first embodiment in that the transmission of the amplifier signal from a unit cell to a sampling capacitance at the start or at the end of a signal charge readout, is prevented by controlling a sample-hold transistor, not the coupling control transistor.

This solid-state imaging device includes an image area 104 in which a group of unit cells 10-$m$... 10-$n$ are placed in matrix form, a row selection circuit 110, a first vertical signal line 109, a signal processing unit 311 which holds the signal voltage transmitted via the first vertical signal line 109 and cuts noises, a column selection circuit 112, a horizontal signal fine 113, an output amplifier 114, and a group of load transistors 315.

FIG. 10 shows a circuit configuration of the signal processing unit 311. In FIG. 10, vertical signal lines connected to pixels of two columns are shown corresponding to the image area 104 of the solid-state imaging device shown in FIG. 9.

The signal processing unit 311 includes: a sample-hold transistor 401 set for each column of the unit cells 10 and inserted into a signal line between the unit cell 10 and the sampling capacitance 205, that is, between the first vertical signal line 109 and the second vertical signal line 203; a clamp capacitance 202; a second vertical signal line 203; a sampling transistor 204; a sampling capacitance 205; a clamp transistor 206; a column selection transistor 207; a horizontal signal line capacitance 208; and the signal processing circuit 409.

The sample-hold transistor 401 is switched on in response to an application of a sampling pulse for raising the electric potential of an SP line to high level, and transmits signal voltage transmitted from the first vertical signal line 109 to the clamp capacitance 202. In addition, the sample-hold transistor 401 is switched off in response to the application of a sampling pulse for lowering the electric potential of the SP line to low level, and prevents transmission of amplifier signals from corresponding column of the unit cells 10 to the sampling capacitance 205.

The signal processing circuit 409 applies pulses to the SP line, the SW line, and the CP line. In addition, both at the start and at the end of the signal charge readout performed by the readout transistor 12, on and off of the sample-hold transistor 401 is controlled in order to prevent the transmission of the amplifier signal from the unit cell 10 to the sampling capacitance 205. In other words, the signal processing circuit 409 switches off the sample-hold transistor 401 at the start and at the end of the signal charge readout performed by the readout transistor 12.

Note that the sample-hold transistor 401 and the signal processing circuit 409 are respectively examples of the second transmission prevention transistor and the second control unit, and configure the transmission prevention unit.

As described above, the solid-state imaging device according to the second embodiment of the present invention is characterized in that the device has the signal processing circuit 409 connected to the sample-hold transistor 401 as the transmission prevention unit.

The operation of the solid-state imaging device according to the second embodiment is described hereafter with reference to a driving timing chart shown in (a) in FIG. 11.

When the unit cell 10-m in mth row is selected, in a time domain shown as A in (a) in FIG. 11, a row selection pulse (m) for raising the electric potential of an LSET (m) line to high level is applied to the vertical selection transistor 16. The vertical selection transistor 16 is switched on. A source follower circuit is formed by the amplifier transistor 14, and a group of load transistors 315, and the voltage following the pixel power supply of the unit cell 10 is outputted from the source follower circuit to the first vertical signal line 109.

In addition, a sampling pulse for raising the electric potential of the SP line to high level is applied to the sample-hold transistor 401. The sample-hold transistor 401 is switched on and the voltage outputted from the source follower circuit to the first vertical signal line 109 is held in the clamp capacitance 202. Here, a clamp pulse for raising the electric potential of the CP line to high level is applied to the clamp transistor 206. The clamp transistor 206 is switched on and the second vertical signal line 203 side of the clamp capacitance 202 is reset to the electric potential of the CLDCNC line. In addition, since a capacitance selection pulse for raising the electric potential of the SW line to high level is applied at the same time, the sampling transistor 204 is switched on, and the sampling capacitance 205 is reset to the electric potential of the CLDCNC line.

Next, a reset pulse (m) for raising the electric potential of the RESET (m) line to high level is applied to the reset transistor 13. The reset transistor 13 is switched an, and the electric potential of the FD unit 15 is reset. A gate voltage of the amplifier transistor 14 connected to the FD unit 15 becomes the voltage of the FD unit 15, and a voltage in accordance with this voltage is outputted to the first vertical signal line 109.

Next, a clamp pulse for lowering the electric potential of the CP line to low level is applied to the clamp transistor 206. The clamp transistor 206 is switched off, and the electric potential of the second vertical signal line 203 falls in a floating state.

Next, in a time region shown as B in (a) in FIG. 11, a readout pulse (m) for raising the electric potential of READ (m) line to high level is applied to the readout transistor 12. The readout transistor 12 is switched on, and the signal charge which is accumulated in the photodiode 11 is transferred to the FD unit 15. The gate voltage of the amplifier transistor 14 connected to the FD unit 15 becomes the electric potential of the ED unit 15, and a voltage corresponding to this voltage is outputted to the first vertical signal line 109. Here, the clamp transistor 206 is switched off, since a clamp pulse for lowering the electric potential the CP line is to low level applied to the clamp transistor 206. In the sampling capacity 205, voltage change corresponding to a difference between the voltage which is outputted to the first vertical signal line 109 when the electric potential of the FD unit 15 is reset and the voltage outputted to the first vertical signal line 109 when a signal charge accumulated in the photodiode 11 is transferred to the FD unit 15, is accumulated as a signal voltage of the unit cell 10-m in mth row.

Here, when the readout transistor 12 switched on from off-state ($t_1$ in FIG. 11), and when switched off from on-state ($t_2$ in FIG. 11), the sampling pulse is temporarily lowered to low level and the sample-hold transistor 401 is switched off. Thus, as shown in (b) in FIG. 11, when the readout transistor 12 is switched on from off-state, the influence of a voltage coupling to the FD unit 15 caused by a parasitic capacitance between the gate and the source of the readout transistor 12 is transmitted to the first vertical signal line 109, but not to the second signal line 203. In addition, when the readout transistor 12 switched off from on-state, the influence of a voltage coupling to the FD unit 15 caused by the parasitic capacitance between the gate and the source of the readout transistor 12 is also transmitted to the first vertical signal line 109, but not to the second vertical signal line 203.

Next, in a time region shown as C in (a) in FIG. 11, a column selection pulse (m) for raising the electric potential of the CSEL (m) line to high level, a column selection pulse (m+1) for raising the electric potential of the CSEL (m+1) line to high level . . . are sequentially applied to the column selection transistor 207. Each of the column selection transistors 207 is sequentially switched on, and the signal voltage accumulated in the sampling capacitance 205 is sequentially outputted to the horizontal signal line 113.

As described above, according to the solid-state imaging device according to the second embodiment, in the case where the readout transistor 12 is switched on from off-state, and switched off from on-state, the sample-hold transistor 401 is temporarily switched off by lowering the sampling pulse to low level. Although a voltage change in the gate of the readout transistor 12 causes coupling to the FD unit 15 via the capacitance between the source and the gate and the electric potential of the FD unit 15 changes, the transmission of the electric potential change to the second vertical signal line 203 via a source follower of the FD unit 15 can be suppressed. In other words, image quality defect caused by coupling influence occurred in each row can be suppressed since it is possible to suppress the transmission of the coupling in the FD unit 15 to the second vertical signal line 203 and the influence caused by the coupling variation to the second vertical signal line 203. Therefore, image quality defect caused by coupling can be suppressed.

In addition, according to the solid-state imaging device of the second embodiment, since it is not necessary to set a new transistor for suppressing the transmission of coupling influence in the FD unit 15 to the second vertical signal line 203, a high performance and low-cost solid-state imaging device can be realized.

It is noted that, in the solid-state imaging device of the second embodiment, on and off of the sample-hold transistor 401 is controlled so that the transmission of the amplifier signals from the unit cell 10 to the sampling capacity 205 is prevented both at the start and the end of the signal charge readout by the readout transistor 12. However, either at the start or the end of the signal charge readout by the readout transistor 12, the on and off of the sample-hold transistor 401 may be controlled so that the transmission of the amplifier signal from the unit cell 10 to the sampling capacity 205 can be prevented.

In other words, as shown in (a) in FIG. 12, only when the readout transistor 12 is switched on from off-state, the sample-hold transistor 401 may temporarily be switched off by lowering the level of the sampling pulse to low level. Thus, as shown in (b) in FIG. 12, when the readout transistor 12 is switched on from off state, transmission of the influence of coupling in the FD unit 15 to the second vertical signal line 203 can be suppressed, and thus transmission of the coupling variation in the FD unit 15 to the second vertical signal line 203 can be suppressed. Therefore, image quality defect caused by coupling can be suppressed.

In addition, as shown in (a) in FIG. 13, only when the readout transistor 12 is switched off from on-state, the sample-hold transistor 401 may be temporarily switched off by lowering the level of the sampling pulse to low level. Thus, as shown in (b) in FIG. 13, when the readout transistor 12 is switched off from on state, the transmission of the coupling influence in the FD unit 15 to the second vertical signal line 203 can be suppressed, and thus the influence of the coupling variation in the FD unit 15 can be suppressed. Therefore, image quality defect caused by coupling can be suppressed.

Third Embodiment

A camera according to the third embodiment of the present invention shall be described hereinafter with reference to the diagrams.

FIG. 14 is a block diagram showing a camera according to the third embodiment.

The camera is a camera using an amplifying solid-state imaging device 1010 according to the first and the second embodiments, and includes a lens 1000, a solid-state imaging device 1010, a driving circuit 1020, a signal processing unit 1030, and an external interface unit 1040.

In the camera with the configuration above, processing until the signals are externally outputted is performed in the following order.

(1) Light passes through the lens 1000, and enters the solid-state imaging device 1010.

(2) The signal processing unit 1030 drives the solid-state imaging device 1010 through the driving circuit 1020, and loads output signals from the solid-state imaging device 1010.

(3) The signals processed in the signal processing unit 1030 are outputted externally via the external interface unit 1040.

The camera according to the third embodiment, it is possible to realize a camera with a solid-state imaging device capable of suppressing image quality defect caused by coupling. Therefore, a camera of high image quality can be realized.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

For example, the driving timing of the solid-state imaging device may be a combination of the timings presented in the first or the second embodiments.

Industrial Applicability

The present invention can be utilized for a solid-state imaging device and driving method thereof, and particularly to an amplifying solid-state imaging device and driving method thereof, and the like.

What is claimed is:

1. An amplifying solid-state imaging device, comprising:
a unit cell which (i) includes a photodiode which converts light to a signal charge and accumulates the signal charge, and a readout transistor which reads the signal charge from the photodiode, and (ii) outputs an amplifier signal corresponding to the signal charge;
a signal line connected to said unit cell;
an accumulation element which accumulates the amplifier signal transmitted via said signal line; and
a transmission prevention unit configured to substantially prevent transmission of the amplifier signal from said unit cell to said accumulation element during an entire period from a start of to an end of the signal charge readout performed by the readout transistor.

2. The solid-state imaging device according to claim 1, wherein said transmission prevention unit comprises a transmission prevention transistor interposed in said signal line between said unit cell and said accumulation element, and a control unit configured to control the transmission prevention transistor.

3. The solid-state imaging device according to claim 1, wherein said transmission prevention unit comprises a constant-voltage source connected to the signal line between said unit cell and said accumulation element, a transmission prevention transistor interposed between the constant-voltage source and the signal line, and a control unit configured to control the transmission prevention transistor.

4. A driving method of an amplifying solid-state imaging device which includes: a unit cell which (i) includes a photodiode which converts light to a signal charge and accumulates the signal charge, and (ii) a readout transistor which reads the signal charge from the photodiode, and outputs an amplifier signal corresponding to the signal charge; a signal line connected to the unit cell; an accumulation element which accumulates the amplifier signal transmitted via the signal line; a transmission prevention transistor interposed between the unit cell and the accumulation element; and a control unit configured to control the transmission prevention transistor, the method comprising:
controlling, by the control unit, the transmission prevention transistor to be switched off during an entire period substantially corresponding to a period from a start of to an end of the signal charge readout performed by the readout transistor.

5. The driving method of the solid-state imaging device according to claim 4,
wherein a plurality of unit cells are placed in rows and columns,
the accumulation element is provided for each column of the unit cells and accumulates amplifier signal of the column of the unit cells,
the transmission prevention transistor is provided for each column of the unit cells, and
wherein the controlling, by the control unit, controls the transmission prevention transistor provided for a predetermined column of the unit cells to be switched off during an entire period substantially corresponding to a period from a start of to an end of the signal charge readout performed in each unit cell of the predetermined column.

6. The driving method of the solid-state imaging device according to claim 4,
wherein the controlling, by the control unit, controls the transmission prevention transistor to prevent the transmission of the amplifier signal from the unit cell to the accumulation element both at the start of and at the end of the period in which the signal charge readout is performed by the readout transistor.

7. A driving method of an amplifying solid-state imaging device which includes: a unit cell which (i) includes a photodiode which converts light to a signal charge and accumulates the signal charge and a readout transistor which reads the signal charge from the photodiode, and (ii) outputs an amplifier signal corresponding to the signal charge; a signal line connected to the unit cell; an accumulation element which accumulates the amplifier signal transmitted via the signal line; a constant-voltage source connected to the signal line between the unit cell and the accumulation element; a transmission prevention transistor interposed between the constant voltage source and the signal line; and a control unit configured to control the transmission prevention transistor, the method comprising:

controlling the transmission prevention transistor to be switched off by the control unit during an entire period substantially corresponding to a period from a start of to an end of the signal charge readout.

8. The driving method of the solid-state imaging device according to claim 7, wherein a plurality of unit cells are placed in rows and columns, the accumulation element is provided for each column of the unit cells and accumulates amplifier signal of the column of the unit cells, the transmission prevention transistor is provided for each column of the unit cells, and wherein the controlling controls the transmission prevention transistor provided for a predetermined column of the unit cells to be switched off during an entire period substantially corresponding to a period from a start of to an end of the signal charge readout performed in each unit cell of the predetermined column.

9. The driving method of the solid-state imaging device according to claim 7, wherein the controlling, by the control unit, controls the transmission prevention transistor to prevent the transmission of the amplifier signal of the unit cell to the accumulation element both at the start of and at the end of the signal charge readout performed by the readout transistor.

10. A camera, comprising:

a solid-state imaging device, including:
a unit cell which (i) includes a photodiode which converts light to a signal charge and accumulates the signal charge, and a readout transistor which reads the signal charge from the photodiode, and (ii) outputs an amplifier signal corresponding to the signal charge;
a signal line connected to said unit cell;
an accumulation element which accumulates the amplifier signal transmitted via said signal line; and
a transmission prevention unit configured to substantially prevent transmission of the amplifier signal from said unit cell to said accumulation element during an entire period from a start of to an end of the signal charge readout performed by the readout transistor;

a signal processing unit; and
a driving circuit,
wherein said signal processing unit is configured to drive said solid-state imaging device through the driving circuit, to load and process an output signal from said solid-state imaging device, and to externally output the processed signal.

11. An amplifying solid-state imaging device, comprising:
a unit cell which (i) includes a photodiode which converts light to a signal charge and accumulates the signal charge, and a readout transistor which reads the signal charge from the photodiode, and (ii) outputs an amplifier signal corresponding to the signal charge;
a signal line connected to said unit cell;

an accumulation element which accumulates the amplifier signal transmitted via said signal line before the readout transistor reads the signal charge from the photodiode; and
a transmission prevention unit configured to substantially prevent transmission of the amplifier signal from said unit cell to said accumulation element when the signal charge readout from the photodiode, performed by the readout transistor, starts.

12. The solid-state imaging device according to claim 11, wherein said transmission prevention unit comprises a transmission prevention transistor interposed in said signal line between said unit cell and said accumulation element, and a control unit configured to control the transmission prevention transistor.

13. The solid-state imaging device according to claim 11, wherein said transmission prevention unit comprises a constant-voltage source connected to the signal line between said unit cell and said accumulation element, a transmission prevention transistor interposed between the constant-voltage source and the signal line, and a control unit configured to control the transmission prevention transistor.

14. An amplifying solid-state imaging device, comprising:
a unit cell which (i) includes a photodiode which converts light to a signal charge and accumulates the signal charge, and a readout transistor which reads the signal charge from the photodiode, and (ii) outputs an amplifier signal corresponding to the signal charge;
a signal line connected to said unit cell;
an accumulation element which accumulates the amplifier signal transmitted via said signal line after the readout transistor reads the signal charge from the photodiode; and
a transmission prevention unit configured to substantially prevent transmission of the amplifier signal from said unit cell to said accumulation element when the signal charge readout from the photodiode, performed by the readout transistor, ends.

15. The solid-state imaging device according to claim 14, wherein said transmission prevention unit comprises a transmission prevention transistor interposed in said signal line between said unit cell and said accumulation element, and a control unit configured to control the transmission prevention transistor.

16. The solid-state imaging device according to claim 14, wherein said transmission prevention unit comprises a constant-voltage source connected to the signal line between said unit cell and said accumulation element, a transmission prevention transistor interposed between the constant-voltage source and the signal line, and a control unit configured to control the transmission prevention transistor.

17. A camera, comprising:
a solid-state imaging device, including:
a unit cell which (i) includes a photodiode which converts light to a signal charge and accumulates the signal charge, and a readout transistor which reads the signal charge from the photodiode, and (ii) outputs an amplifier signal corresponding to the signal charge,
a signal line connected to said unit cell;
an accumulation element which accumulates the amplifier signal transmitted via said signal line before the readout transistor reads the signal charge from the photodiode; and
a transmission prevention unit configured to substantially prevent transmission of the amplifier signal from said unit cell to said accumulation element when the signal charge readout, performed by the readout transistor, starts;

a signal processing unit; and a driving circuit, wherein said signal processing unit is configured to drive said solid-state imaging device through the driving circuit, to load and process an output signal from said solid-state imaging device, and to externally output the processed signal.

18. A camera, comprising:

a solid-state imaging device including
- a unit cell which (i) includes a photodiode which converts light to a signal charge and accumulates the signal charge, and a readout transistor which reads the signal charge from the photodiode, and (ii) outputs an amplifier signal corresponding to the signal charge,
- a signal line connected to said unit cell;
- an accumulation element which accumulates the amplifier signal transmitted via said signal line after the readout transistor reads the signal charge from the photodiode; and
- a transmission prevention unit configured to substantially prevent transmission of the amplifier signal from said unit cell to said accumulation element when the signal charge readout, performed by the readout transistor, ends;

a signal processing unit; and a driving circuit, wherein said signal processing unit is configured to drive said solid-state imaging device through the driving circuit, to load and process an output signal from said solid-state imaging device, and to externally output the processed signal.

* * * * *